(12) United States Patent
Ahlstrom et al.

(10) Patent No.: US 11,235,252 B2
(45) Date of Patent: Feb. 1, 2022

(54) METHOD AND APPARATUS FOR PROVIDING A COMPUTER IMPLEMENTED GAME

(71) Applicant: KING.COM LIMITED, St. Julians (MT)

(72) Inventors: Kim Ahlstrom, London (GB); Patrik Stymne, Stockholm (SE); Joakim Brunnestom, San Francisco, CA (US)

(73) Assignee: KING.COM LTD., St. Julians (MT)

( * ) Notice: Subject to any disclaimer, the term of this patent is extended or adjusted under 35 U.S.C. 154(b) by 651 days.

(21) Appl. No.: 15/848,023

(22) Filed: Dec. 20, 2017

(65) Prior Publication Data
US 2018/0178132 A1    Jun. 28, 2018

Related U.S. Application Data

(60) Provisional application No. 62/437,980, filed on Dec. 22, 2016.

(51) Int. Cl.
| | |
|---|---|
| *A63F 13/00* | (2014.01) |
| *A63F 13/87* | (2014.01) |
| *A63F 13/79* | (2014.01) |
| *H04L 12/58* | (2006.01) |
| *A63F 13/88* | (2014.01) |

(52) U.S. Cl.
CPC .............. *A63F 13/87* (2014.09); *A63F 13/79* (2014.09); *A63F 13/88* (2014.09); *H04L 51/32* (2013.01); *A63F 2300/537* (2013.01)

(58) Field of Classification Search
CPC ........ A63F 13/87; A63F 13/795; A63F 13/12; A63F 13/572; A63F 13/48; A63F 13/847; A63F 13/34
See application file for complete search history.

(56) References Cited

U.S. PATENT DOCUMENTS

| | | | | |
|---|---|---|---|---|
| 6,966,837 B1 * | 11/2005 | Best | ................. | A63F 13/10 |
| | | | | 463/33 |
| 7,445,549 B1 * | 11/2008 | Best | ................. | A63F 13/10 |
| | | | | 463/32 |
| 8,052,518 B1 * | 11/2011 | Kelly | ................. | G07F 17/32 |
| | | | | 463/25 |
| 8,444,482 B2 * | 5/2013 | Aoki | ................. | G07F 17/32 |
| | | | | 463/25 |
| 2011/0034240 A1 * | 2/2011 | Naicker | ............ | G07F 17/32 |
| | | | | 463/27 |

* cited by examiner

*Primary Examiner* — Omkar A Deodhar
*Assistant Examiner* — Eric M Thomas
(74) *Attorney, Agent, or Firm* — Saul Ewing Arnstein & Lehr LLP

(57) ABSTRACT

A first user device is provided. Via the user interface a first computer implemented game within a messaging application can be selected. The first computer implemented game is related, but different, to second computer implemented game. Game play in one of the first and second computer implemented game is dependent on game play in the other of the first and second computer implemented games.

21 Claims, 14 Drawing Sheets

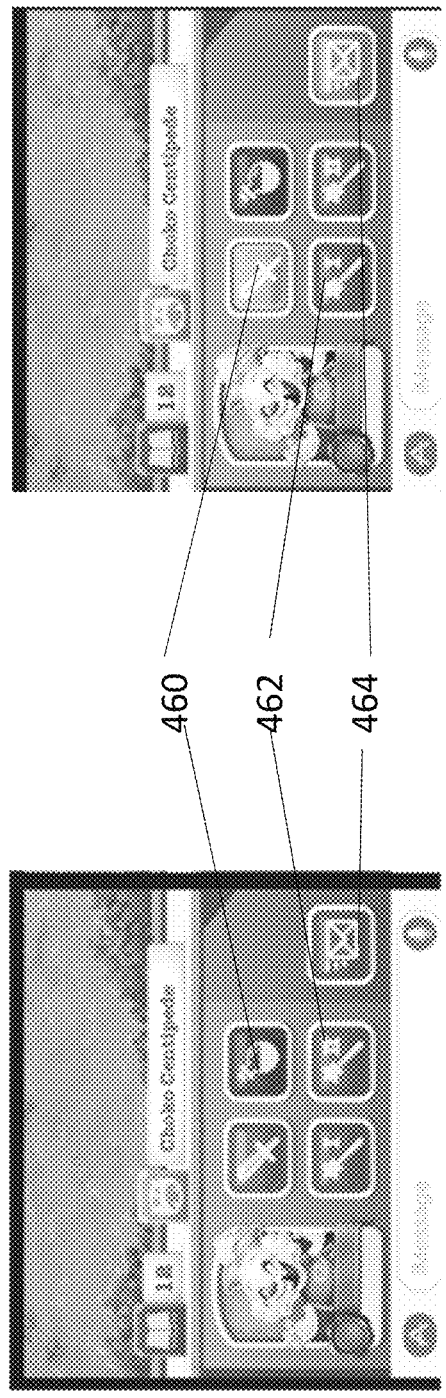

FIG. 7A

| Player ID 600 | Game ID 602 | Device ID 604 | Game level 606 | Player 2 ID 612 | Message 608 |

FIG. 7B

| Player ID 600 | Game ID 602 | Game event 612 |

METHOD AND APPARATUS FOR PROVIDING A COMPUTER IMPLEMENTED GAME

CROSS-REFERENCE TO RELATED APPLICATION

This application is based on, and claims priority to U.S. Provisional Application No. 62/437,980, filed on Dec. 22, 2016, the entire contents of which being fully incorporated herein by reference.

FIELD OF THE INVENTION

Embodiments of this application relate to a user device for use in playing a computer implemented game.

Some embodiments may relate to engaging users or players in a computer game executable in an online environment.

BACKGROUND OF THE INVENTION

So-called casual games are a genre of games which have become very popular. However there are many technical challenges associated with such games.

One technical challenge is how to retain casual game play where a user is able to play a game as and when they like while at the same time having an aspect which involves interaction with other players.

Another technical challenge relates to how to keep players interested whilst using limited resources of a device on which a game is being played.

This patent specification describes not only various ideas and functions, but also their creative expression. A portion of the disclosure of this patent document therefore contains material to which a claim for copyright is made and notice is hereby given: Copyright King.com Limited 2016 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to a first aspect, there is provided a first computer device, the first computer device having at least one processor, at least one memory, a display, and a user interface, the at least one processor configured to: cause the display to display images associated with a messaging application; receive first user input information from the user interface to select a first computer implemented game within the messaging application, the first computer implemented game being related to second computer implemented game, the first computer implemented game being different to the second computer implemented game, whereby game play in one of the first and second computer implemented game is dependent on game play in the other of the first and second computer implemented game, cause the display to display game information for the first computer implemented game; receive second user input information from the user interface with respect to first computer implemented game; and cause a first message to be sent via the messaging application to a second computer device associated with a second user responsive to the received second user input information.

The game information may comprise one or more of: a game board for the first computer implemented game; selectable game options for the first computer game; and one or more game launch options for the first computer implemented game.

The at least one processor may be configured to receive third user input information from the user interface and in response thereto to cause a launch of the messaging application and the display of the images associated with the messaging application.

The second user input information may define one or more moves with respect to the first computer implemented game and the message may comprise information relating to the one or more moves.

The at least one processor may be configured to receive a second message comprising information relating to at least one move made at the second computer device and in response to said second message displaying on the display updated game information.

The first computer implemented game may comprise a game for two or more players and the second computer implemented game may comprise a game for a single player.

The first computer implemented game may be a collaborative game.

At least one game play option for the first computer implemented game may be dependent on information associated with the second computer implemented game.

The at least one game play option for the first computer implemented game may comprise one or more of: game character; in-game assistance; game rules; and game graphics.

The at least one processor may be configured to cause the sending a third message to a third computer device associated with a third user whilst in a conversation of the messaging application, the third message to the third computer device comprising game information related to the first computer implemented game, and to receive a fourth message comprising information relating to interaction, by the third user at the third computer device, with the first computer implemented game, whereby the first user, the second user and the third user play the same instance of the first computer implemented game.

The at least one processor may be configured to receive fourth user input via the user interface to select the first computer implemented game within the messaging application in a second conversation, the second conversation being a different conversation to a first conversation between the first and second users, the second conversation being between the first user and at least one other user, there being different instances of the first computer implemented game in the first and second conversations.

The at least one processor may be configured to be responsive to receiving the second user input from the user interface to cause display on the display of a video image associated with second user input, the first message comprising a video clip of the video image.

The first and second computer games may be provided by a same application.

The first and second computer games may be provided by respective applications.

The at least one processor may be configured to receive a fifth user input from the user interface to select a message send option, and in response to provide a draft of the first message in the message application and in response to a sixth input selecting a send option, causing the first message to be sent.

The first implemented game may comprise a plurality of different game challenges, the at least one processor configured to determine if a current game challenge has been completed and if so, provide a next game challenge.

The next game challenge may be dependent on a location of one or more of the first and second computer devices.

The at least one processor may be configured to determine if a time criteria has been satisfied and the game challenge has been completed, and when both the time criteria has been satisfied and the game challenge has been completed providing a next game challenge.

A set of images may be provided within the messaging application, one or more images in the set of images being dependent on game play in at least one of one of the first and second computer implemented games.

The at least one processor is configured to capture one or more of a still image and a moving image during game play of the first computer implemented game and cause the captured one or more of the still image and moving image be transmitted in the conversation.

The receipt of the one or more of the still image and moving image may facilitate the making of for example a move at the device. The one or more of the still image and moving image may be such that interaction therewith via the user interface may cause a game area to be displayed at the second device.

According to another aspect, there is provided a non-transitory computer readable storage device storing instructions that, when executed by at least one processor of a computer device causes the at least one processor to perform the following steps: cause a display to display images associated with a messaging application; receive first user input information from the user interface to select a first computer implemented game within the messaging application, the first computer implemented game being related to second computer implemented game, the first computer implemented game being different to the second computer implemented game, whereby game play in one of the first and second computer implemented games is dependent on game play in the other of the first and second computer implemented games, cause the display to display game information for the first computer implemented game; receive second user input information from the user interface with respect to first computer implemented game; and cause a first message to be sent via the messaging application to a second computer device associated with a second user responsive to the received second user input information.

According to another aspect, there is provided a computer implemented method performed by a first computer device, the first computer device having at least one processor, at least one memory, a display, and a user interface, the method comprising: causing the display to display images associated with a messaging application; receiving first user input information from the user interface to select a first computer implemented game within the messaging application, the first computer implemented game being related to second computer implemented game, the first computer implemented game being different to the second computer implemented game, whereby game play in one of the first and second computer implemented games is dependent on game play in the other of the first and second computer implemented games, causing the display to display game information for the first computer implemented game; receiving second user input information from the user interface with respect to first computer implemented game; and causing a first message to be sent via the messaging application to a second computer device associated with a second user responsive to the received second user input information.

The game information may comprise one or more of: a game board for the first computer implemented game; selectable game options for the first computer game; and one or more game launch options for the first computer implemented game.

The method may comprise receiving third user input information from the user interface and in response thereto causing a launch of the messaging application and the display of the images associated with the messaging application.

The second user input information may define one or more moves with respect to the first computer implemented game and the message may comprise information relating to the one or more moves.

The method may comprise receiving a response message comprising information relating to at least one move made at the second computer device and in response to the message displaying on the display updated game information.

The first computer implemented game may comprise a game for two or more players and the second computer implemented game may comprise a game for a single player.

The first computer implemented game may be a collaborative game.

At least one game play option for the first computer implemented game may be dependent on information associated with the second computer implemented game.

The at least one game play option for the first computer implemented game may comprise one or more of: game character; in-game assistance; game rules; and game graphics.

The method may comprise causing the sending of a message to a third computer device associated with a third user whilst in a conversation of the messaging application, the message to the third computer device comprising game information related to the first compute implemented game, and receiving a response message comprising information relating to interaction, by the third user at the third computer device, with the first computer implemented game, whereby the first user, the second user and the third user play the same instance of the first computer implemented game.

The method may comprise receiving fourth user input via the user interface to select the first computer implemented game within the messaging application in a second conversation, the second conversation being a different conversation to a first conversation between the first and second users, the second conversation being between the first user and at least one other user, there being different instances of the first computer implemented game in the first and second conversations.

The method comprise responsive to receiving the second user input from the user interface causing display on the display of a video image associated with second user input, the message to be sent via the messaging application to the second computer device comprising a video clip of the video image.

The first and second computer games may be provided by a same application.

The first and second computer games may be provided by respective applications.

The method may comprise receiving a fifth user input from the user interface to select a message send option, and in response providing a draft of the message in the message application and in response to a sixth input selecting a send option, causing the message to be sent.

The first implemented game may comprise a plurality of different game challenges, method comprising determining if a current game challenge has been completed and if so, provide a next game challenge.

The next game challenge may be dependent on a location of one or more of the first and second computer devices.

The method may comprise determining if a time criteria has been satisfied and the game challenge has been completed, and when both the time criteria has been satisfied, and the game challenge has been completed providing a next game challenge.

A set of images may be provided within the messaging application, one or more images in the set of images being dependent on game play in at least one of one of the first and second computer implemented games.

The method may comprise capturing one or more of a still image and a moving image during game play of the first computer implemented game and causing the captured one or more of the still image and moving image be transmitted in the conversation.

The receipt of the one or more of the still image and moving image may facilitate the making of for example a move at the device. The one or more of the still image and moving image may be such that interaction therewith via the user interface may cause a game area to be displayed at the second device.

According to some aspects, there is provided a program product comprising a computer-readable storage device including a computer-readable program for providing a computer-implemented game, wherein the computer-readable program when executed on a computer causes the computer to perform any one or more of the method steps described previously.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

To understand some embodiments, reference will now be made by way of example only to the accompanying drawings, in which:

FIGS. 3A to 3H show examples of images displayed on a display for a first game;

FIGS. 7A and 7B show a data structures used in some embodiments;

DETAILED DESCRIPTION OF SOME EMBODIMENTS

Figure 1:
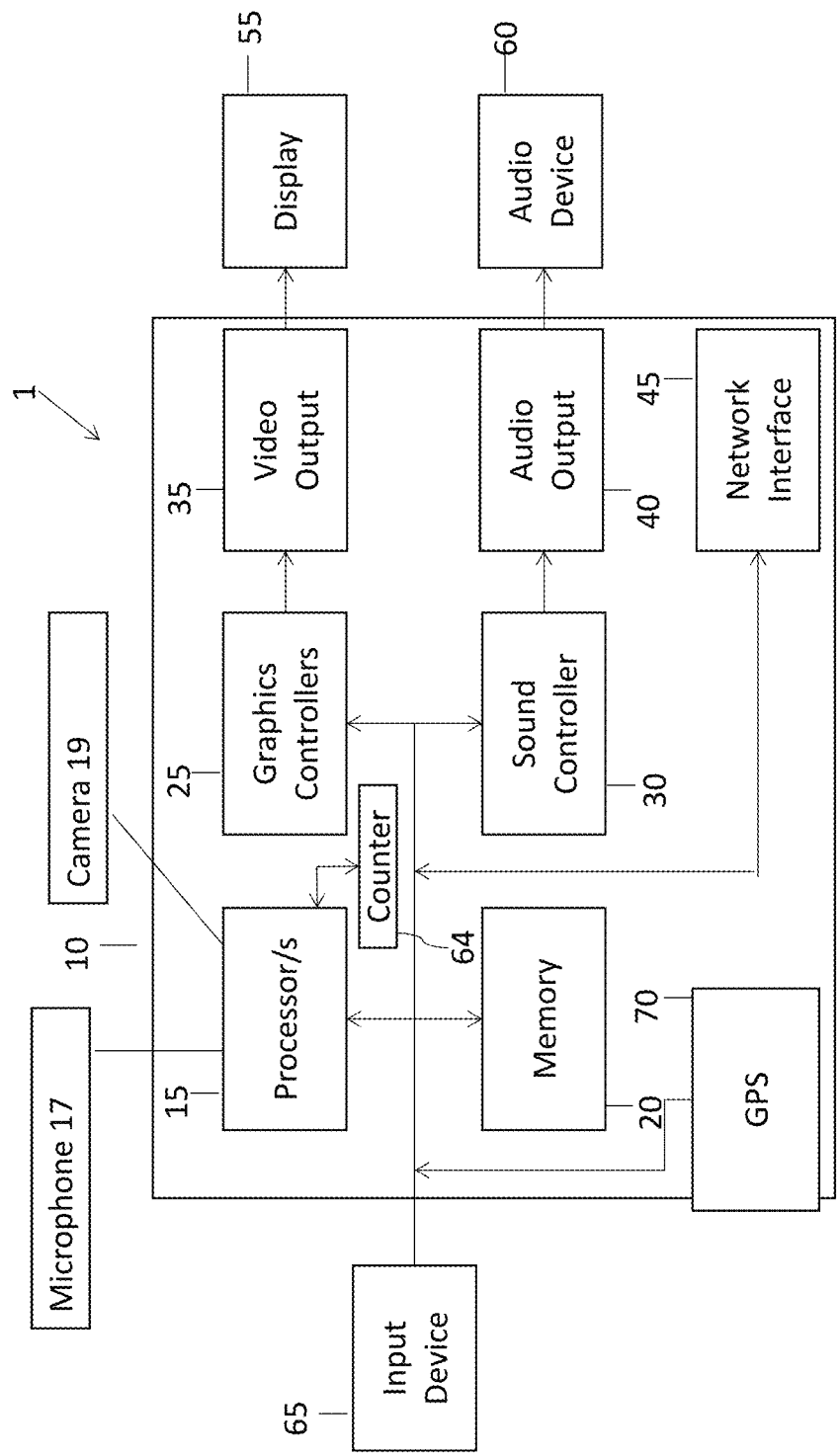
FIG. 1 shows an example user device in which some embodiments may be provided.

A schematic view of a user device 1 according to an embodiment is shown in FIG. 1. All of the blocks shown are implemented by suitable circuitry. The blocks may be implemented in hardware and/or software. The user device may have a control part 10. The control part may be implemented by one or more processors 15 and one or more memories 20.

The control part 10 is shown as having a graphics controller 25 and a sound controller 30. It should be appreciated that one or other or both of the graphics controller 25 and sound controller 30 may be provided by the one or more processors 15 or may be separately provided. The graphics and sound controllers may comprise memory and/or may operate in conjunction with the one or more memories 20.

The graphics controller 25 is configured to provide a video output 35. The sound controller 30 is configured to provide an audio output 40. The video output 35 is provided to a display 55. The audio out 40 is provided to an audio device 60 such as a speaker and or earphone(s).

An audio capture device such as a microphone 17 may be provided. An audio input may be captured by the microphone and may be processed by the processor and/or any other suitable processor. This is optional is some embodiments In other embodiments, the sound controller and audio device may additionally capture and process audio data.

An image capture device 19 may be provided. The image capture device is a camera in some embodiments. The image captured by the camera may be processed by the processor and/or any other suitable processor. This is optional is some embodiments.

The control part 10 has an interface 45 allowing the device to be able to communicate with a network such as the Internet or other communication infrastructure. The control part 10 may have a GPS module 70 or similar configured to provide location information to the at least one processor 15 or memory 20. This is optional is some embodiments.

The device 1 has an input device or user interface 65. The input device can take any suitable format and can be one or more of a keyboard, mouse, touch screen, joystick or game controller. It should be appreciated that the display 55 may in some embodiments also provide the input device 65 by way of an integrated touch screen for example.

The blocks of the control part 10 are configured to communicate with each other by an interconnect such as a bus or any other suitable interconnect and/or by point to point communication.

It should be appreciated that in some embodiments, the controller may be implemented by one or more integrated circuits, at least in part.

The user device 1 is shown by way of example only. In alternative embodiments, one or more of the parts may be omitted. Alternatively or additionally, some embodiments may comprise one or more other parts. Alternatively or additionally, one or more parts may be combined.

Figure 2:
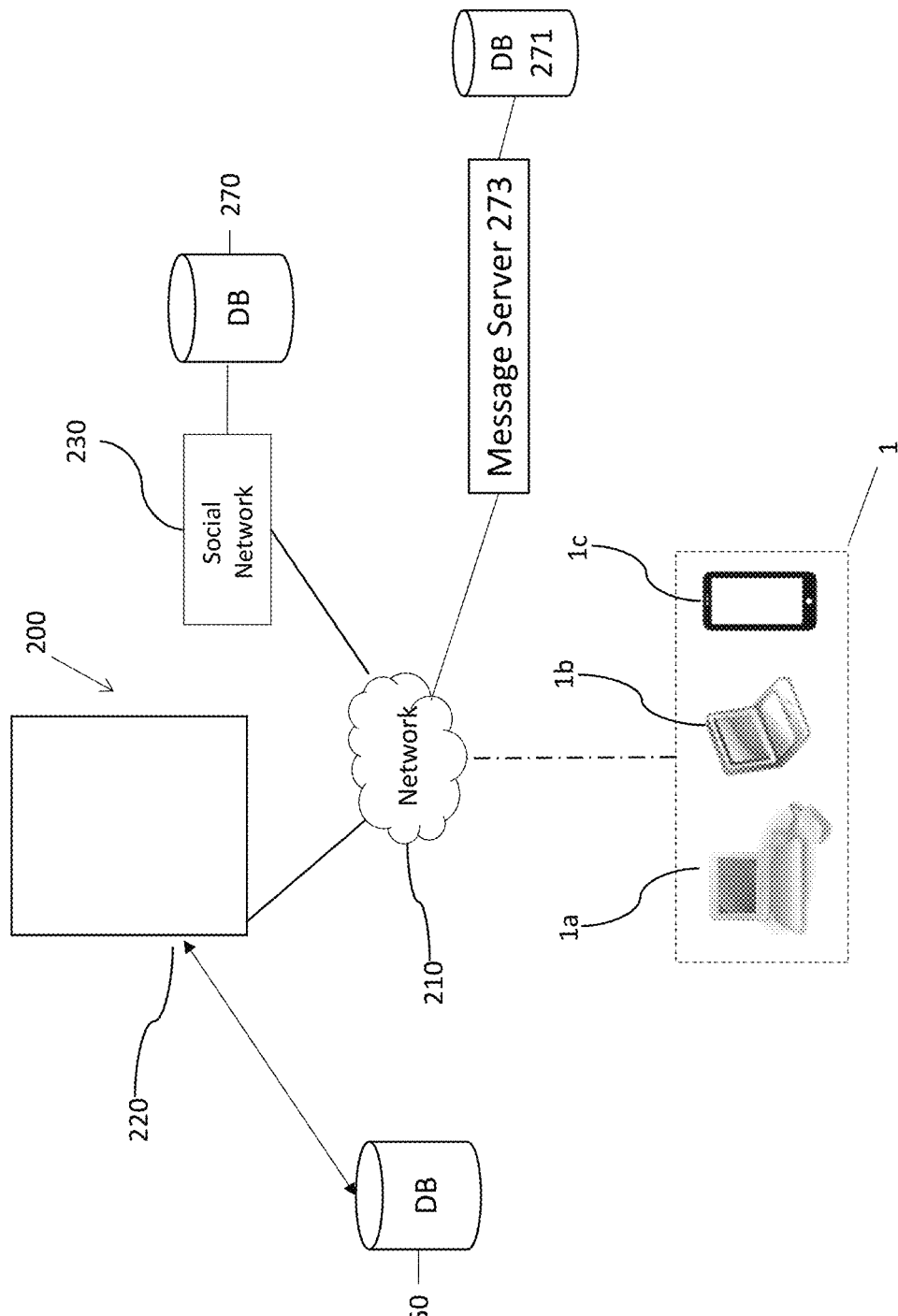
FIG. 2 shows an example system in which some embodiments may be provided.

FIG. 2 schematically shows a system 200 according to an embodiment. The system 200 comprises a computer game infrastructure comprising a computer game server 220 which may store or be in communication with database 250. The database 250 may have game player's details, profiles, statistics etc. In practice, one or more databases 250 may be provided. In practice, one or more computer game servers 220 may be provided. Where one or more computer game server is provided, the database(s) 250 may be provided in one database 250 across two or more servers.

The computer game server 220 may communicate via, for instance, the internet 210 to one or more client or user devices 1, shown in FIG. 1 by way of example as user devices 1a, 1b and 1c, and may further provide connections to a social network 230, for example, Facebook™. The social network 230 may also be connected to a database 270 storing social user interaction details, for instance, user to user interaction maps, friend lists, location history etc. In practice, one or more databases 270 may be provided. The connection to the database 270 of the social network 230 may result in a local copy of the database 270 being made on the user device 1.

A separate message infrastructure is provided to support a messaging application. This infrastructure may comprise a message server 273 and one or more databases 271. A user device supporting the messaging application will communicate with another user device supporting the messaging application via the message infrastructure and the network. The message infrastructure may be separate from the computer game infrastructure in some embodiments. In other embodiments, the message infrastructure and the computer game infrastructure may comprise one or more common parts.

It should be recognised by those skilled in the art that the databases herein referred to may comprise external or remote storage, such as that described as being in a "cloud".

It should be appreciated that embodiments may be deployed in different system architectures. For example, the computer game may be implemented as a computer game that is stored in the memory of the user device and is run on the processor of the user device. However, the server may handle some elements of the game in some embodiments. By way of example only, a Java game applet may be provided to the user device and the locally running Java applet will generate, for example, the graphics, sounds, and user interaction for the game play on the user device. Some data may be fed back to the server to allow interaction with other user devices 305.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

The game may be played in an offline mode on a handheld device using locally stored information on the handheld device. The device may store all or some of the levels that are available as applicable to the particular game and its saga or mission objectives. Some of the features may be locally executed on the device. This may for instance implement a scheme to regenerate lives after a certain period of time, the time may be locally decided based on the clock on the device. In some embodiments, the central game server clock may override the local clock when the local device has been synchronised with the server.

Some embodiments may be implemented to synchronize game state information and/or retrieve and connect to social graph information and user profile data on a social network such as Facebook or Google+.

Some embodiments may be implemented to enable connection to a plurality of social networks. The user may be given the option to select which information may be derived and/or shared with which social network.

Messaging applications are known in which two or more users are able to chat or communicate with each other.

In such an application, a user interacts with a user interface to input a message. The message can comprise text and/or images. In some applications, a user is able to input via the user interface one or more attachments. The attachments can be a photograph or any suitable file. When a user has completed the message, the user will interact with the user interface to the cause the message to be sent. The display may comprise an icon which when selected via the user interface causes the message to be sent. When the message is to be sent, the at least one processor of the device is configured to cause data associated with the message and any other additionally data such as the sender of the message and the recipient of the message to be passed to the transmitter. The message is then transmitted via the messaging infrastructure to the recipient.

When a message is received by a receiver of a user device, the at least one processor of the device is configured to process the received data to cause the received message to be displayed. The at least one processor is configured to determine the sender of the message so that the message can be displayed in the context of a conversation between the sender and recipient.

Message applications support a plurality of different conversations. For example there may be one conversation or chat with a first person and another conversation with a different person. When a user selects a conversation for display, one or more of the messages between the user of the device and that one person will be displayed, generally in chronological order. It should be appreciated that of course in some embodiments, individual messages of a conversation may be deleted or the whole conversation.

It should be appreciated that in some embodiments, a messaging application which supports a conversation between two parties or more than two parties may be used. The messaging application may be any suitable messaging application or app.

In embodiments, the two or more users engaged in the same conversation or group chat or the like in a messaging app are able to play a game.

In some embodiments, either or both of the users are able to invite, using the messaging application one or more other people to play the game.

In some embodiments a user will send a message to the one or more further people in the conversation. In some embodiments, as soon as another person joins the conversation, they will be able to participate in the game if they have the game downloaded. If they do not have the game downloaded, a link to the game may be provided. This link to the game may be provided in the context of the conversation or in any other suitable manner.

In some embodiments, the game server and/or the message server may store in their respective databases for each conversation a respective conversation identifier and a game identifier associated with a respective game being played in that conversation. This game identifier can be used to provide the link to the game to be provided and/or activated. One or more of the game server and the message server may store game data such as moves made, current score, total score, game progress and/or the like.

In some embodiments, even if the another person has the game, a further invitation to play the game may need to be provided in the context of the conversation for that another person to join in the game associated with the conversation.

A given user may be playing more than one game. It should be appreciated that each game will be associated with a given conversation. Different games may be played in the same or different conversations. Different instances of the same game may be played in different conversations.

In some embodiments, the games may be played by the users in a collaborative manner. For example the players of the game may collaborate to defeat one or more common foes.

In some embodiments, the one or more common foes may be easier to defeat the more players that collaborate together.

In other embodiments, the two or more players of a game may be playing against each other.

In some embodiments, the game may have a plurality of different levels or challenges.

The players of the games may need to achieve to certain objectives to proceed to another level or challenge.

In some embodiments, the game may have a story book format with individual chapters. A game may progress through the chapters. For example a new chapter may be provided a regular intervals. In some embodiments a goal associated with a chapter may need to be completed before a new chapter can be opened.

In other embodiments, the game will have new challenges provided on regular basis. For example a new challenge may be provided every day or with any other suitable timing. In some embodiments a new chapter may be provided.

In some embodiments, a next challenge may only be provided if a given time criteria is provided and the previous challenge has been completed.

In some embodiments, the game which is played uses part of a game which is installed on the device and played outside the messaging application. In particular the game will have the regular game provided by its own game application and a so-called mini game which can be played within a conversation in the message application.

In some embodiments, the game application provides a first game and a second game. The first game will be referred to in the following as a main game and the second game will be referred to as a mini game.

In other embodiments, a first game application may provide the first game and a second game application may provide the second game.

The second game application may or may not require the first game application to be stored on the device.

The main game is generally played outside a message application and as will be described later the mini game will be played in the message application. The main game may be a single player game or at least primarily a single player game. In contrast the mini game is a collaborative game with different game play rules to the main game. However both of the games may share one or more features. The common features may be for example characters.

However, in some embodiments, items may be acquired or unlocked or otherwise made available in the mini game as a result of game play in relation to the main game (or vice versa). In some embodiments, the items are provided in the game in which they are acquired as a result of the game play.

In other embodiments, the items which are acquired are not themselves available in the game in which caused the items to be acquired.

The mini game requires information about game play in the first game in order to control the presented mini game.

This game play information for the first game may be available on the device itself, if the first game is installed on the device.

The game play information may alternatively or additionally be obtained from the game server.

Alternatively or additionally, progress or game play in the mini game may influence game play in the main game. In some embodiments, the progress in the main game may have no influence on the progress or game play in the mini game.

In the above described embodiments, a relationship between a "main" game and an associated mini game has been described. In some embodiments there may a relationship between a plurality of different games and a given mini game. For example the items or characters or the like provided in the mini game may be dependent on progress in the game from which the item or character or the like is derived. For example, the items or characters or the like may be provided from two or more different games.

In some embodiments, items or characters may be acquired or unlocked or otherwise made available as a result of game play. This may be in one or other of the one or more in-message games and one or more games outside of the message environment. The items or characters may then be available for use by the user in one or more other games. The one or other games may be another game may be another in message game and/or another game outside of the message environment.

In some embodiments, an inventory of items may be acquired in some embodiments. That inventory of items can be used across a set of two or more games. The set of games may comprise one or more in message games and/or one or more games outside the message environment.

In some embodiments, the items or characters or the like are usable by a player of game in their game play. In some embodiments, the items or characters or the like may be usable by any one or more other players of the team to which the player belongs. In other embodiments, the items or characters or the like may be usable by one or more of the opponents.

In some embodiments, the opponents may be provided by the game itself. In other embodiments, a team of one or more opponents may be provided by one or more other players.

Some embodiments may provide a booster or an item. A booster may be considered to enhance a current move. A booster is one example of an item. Other items may be provided which have an instantaneous effect or can be used in a current level. Other items may have a less immediate effect and may have an effect on ongoing rounds of the game. For example, the item may increase health/damage for one or more levels of the game. In some embodiments, the item may only have an effect after n levels of the game, where n is 1 or more.

Figure 6:
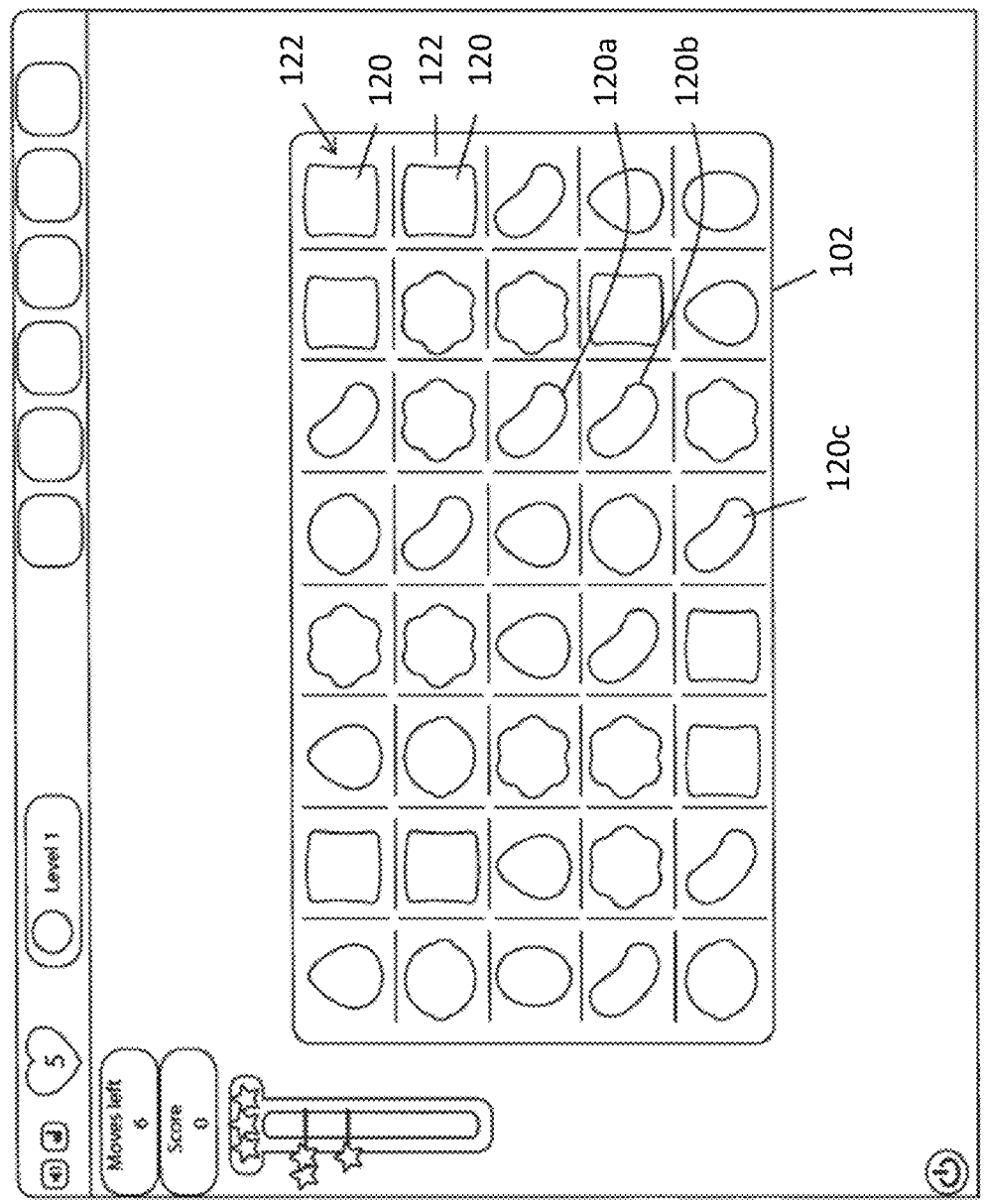
FIG. 6 schematically shows a main game associated with the first game of FIGS. 3A to 3D.

FIG. 6 shows a display of a known version of a match 3 game called Candy Crush Saga™. This is one example of a game which is provided by its own application. Associated with this regular game is a mini game. Before the mini game is described, aspects of the regular game will now be described. FIG. 6 illustrates a game board 102 with a plurality of game elements 120. The game elements are each of six different shapes and colours. Each game element is supported by a tile 122. The tiles are not readily visible to a player of the game—the game elements are the main focus for a player. However, the tiles govern characteristics of the game elements which are visible to a player as will be described in more detail later.

In the known version of the match 3 switcher game, the aim of the game is to swap game elements in the shape of candies with each other to make moves on the game board. To gain points the player has to make moves that create matches of at least three of the same candy. In doing so, the player gains points and the matched candies are removed. As a result new candies fall into place from the top of the game board in order to fill any spaces created. Assume in FIG. 6 that game element 120*c* is moved one place to the right to form a three-line match with game elements 120*a* and 120*b*. This has the effect of game board elements 120*a*, 120*b* and 120*c* "disappearing", creating a visual effect (animation) on the screen to indicate the disappearance. The two game elements which were directly above game elements 120*a* will now fall downwards into the spaces created by the removal of game elements 120*a*, 120*b* and 120*c*. The game elements on the newly created tiles which fall downwards into the game board are generated at random. The user then has a new game board on which to play a subsequent move.

This regular game application is configured to support or control one or more game play aspects of a mini game which can be played in a message application.

An example of such a mini game is now described.

In embodiments, the game play in the mini game is controlled by game play in the main game.

In some embodiments, the characters available in the mini game may depend on the progress in the main game.

In some embodiments, the actual game which is played in the mini game may depend on the progress made in the main game.

In some embodiments, the boosters or in game assistance available may depend on the progress made in the main game.

Figure 3B:
Figure 3A:
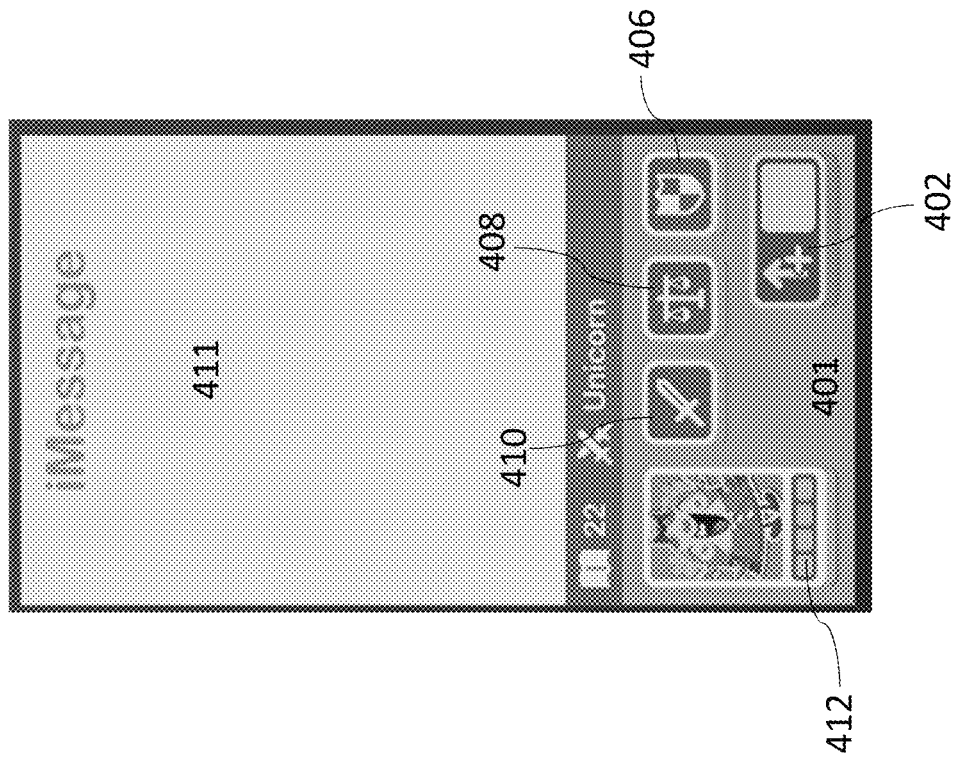

FIG. 3A shows an image displayed on a display. The image comprises a first area 411 which is a message area. In this message area, a dialogue between the user of the current device and another user is displayed. The user will input a message in this area and send via the device to one or more other users. Any reply from the one or more other users will be displayed in this area.

In a second area 401, game images are displayed. The images which are displayed will depend on the game being played. In the example shown in FIG. 3A, the first area is larger than the second area. However, in other embodiments, the areas may be the same size or the second area.

In the example shown in FIG. 3A, the game area 401 comprises a game icon 412 which shows a character used by the user of the current device in game play and three icons 406, 408 and 410 which represent different game play options which can be selected during game play. In the example shown, each one or these game play options represents one option to attack a foe by the character controlled by the player.

An icon 402 for allowing the user to view available boosters or the like may be provided. The available boosters may be dependent on game play and/or for purchase.

FIG. 3B shows the image displayed when the game area 401 is selected by a user via the user input. This may be by the user touching or otherwise selecting a particular icon or image or by the user touching or otherwise selecting any position within the game area. The image has all the icons and the character shown in the game area of FIG. 3A.

Figure 3D:
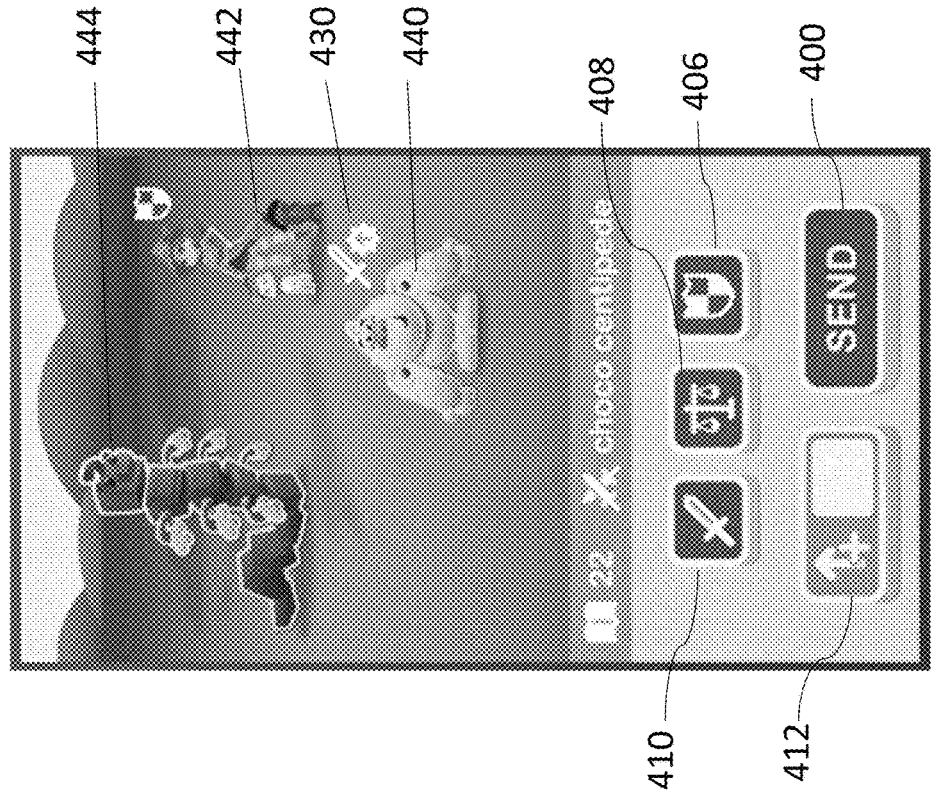
Figure 3C:
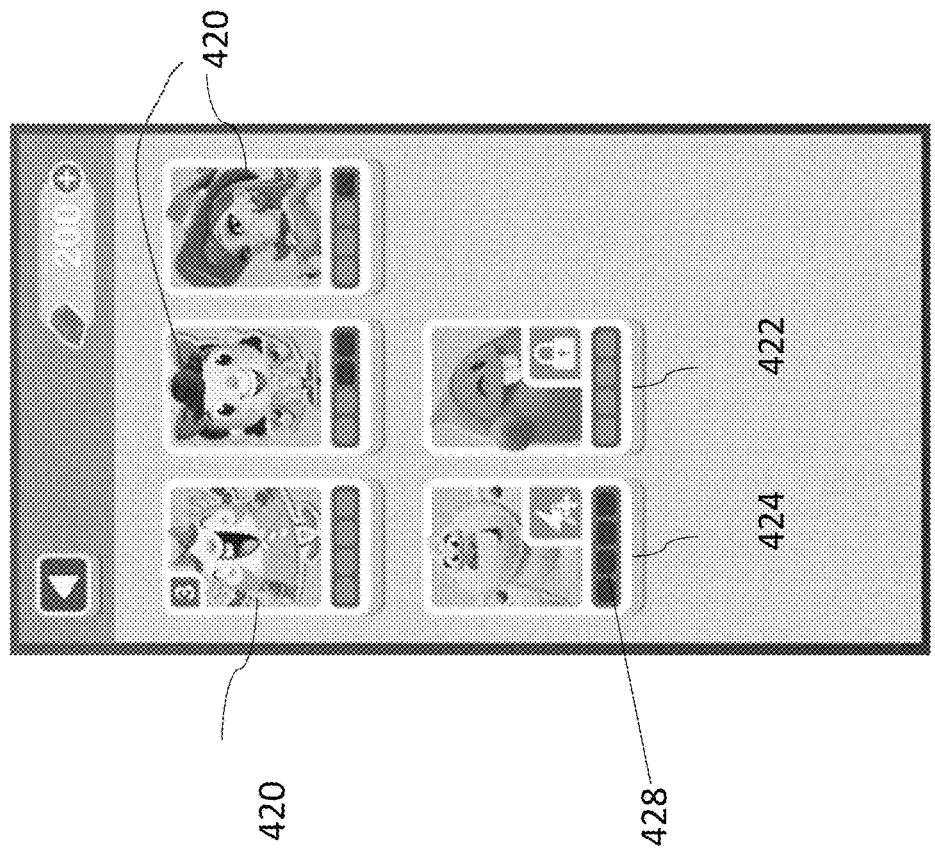

FIG. 3C shows an image of the different characters which are usable in the game. In some embodiments the characters may be displayed by the user selecting the character which is displayed. Those characters 420, 424 which can be used by a user in current game play are shown in one way (without a lock in this example). Those characters 422 which cannot be used by a user in current game play are shown in another way (with a lock 426 in this example). In some embodiments, the locked characters can only be unlocked by progress made in the main game.

Each of the character may be assigned an energy. This energy may define the types of moves that can be made, the number of moves that can be made and if the user can make any moves. For example, if a character runs out of energy then that character may not be used in game play and may be displayed with a suitable indication. This indication is referenced 428.

In some embodiments, an indication is displayed which indicates how much energy has be used or is available. In some embodiments, the energy may be displayed as discrete units. These discrete units may correspond to moves in some embodiments. It should be appreciated that in some embodiments, energy is consumed and provided only in the context of the mini game. In contrast the characters which are available are dependent on progress in the main game.

In some embodiments, the characters which are available in the mini game and displayed may be dependent on the progress made in the main game. The characters which are provided in the mini game, although dependent on the progress in the main game may be the same or different to the characters in the main game.

Figure 3H:
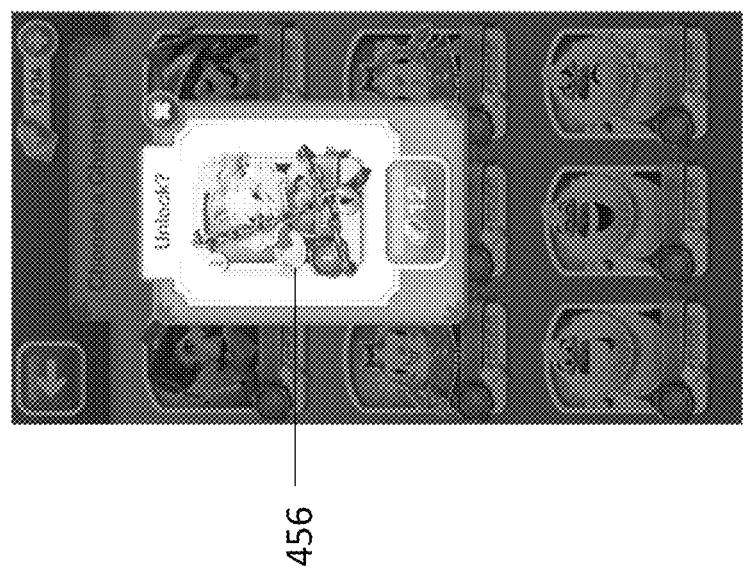
Figure 3G:
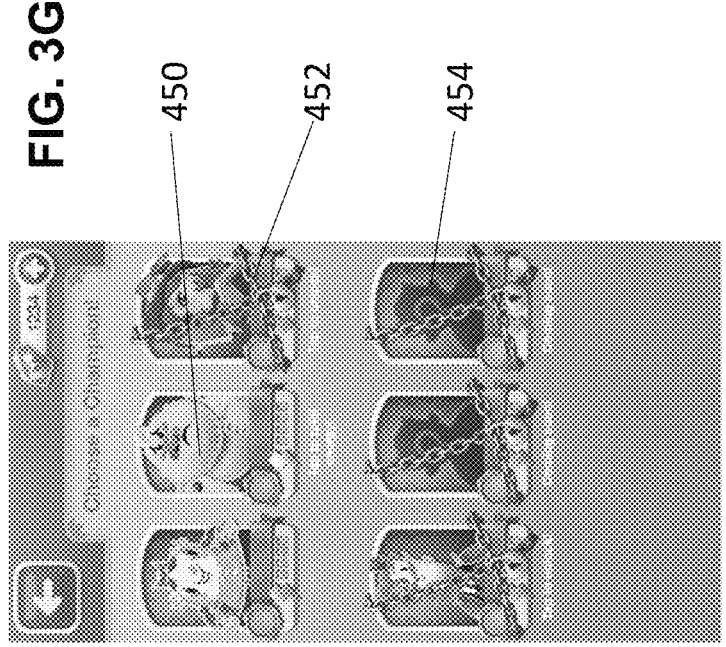

FIG. 3G shows another example image of the different characters which are usable in the game. This may be a different example game to that shown in FIG. 3C. In this example, there are unlocked characters 450, locked characters 452 and characters 454 that will be made available in the future. Each of these different options are shown in a visually distinct manner. For example, the unlocked characters are shown without a lock and the locked characters with a lock. The characters which are to be available in the future may be greyed out and with a lock. These characters may be made available dependent on progress made in the main game, in some embodiments. It should be appreciated that visual representation can take any suitable form and may comprise suitable labelling.

FIG. 3H shows an example where a locked character 456 has been selected. The selected locked character is displayed in a visually distinct manner. In this example, the selected locked character is superimposed in an enlarged format over the greyed out image of the other characters. In this example image, a user is invited to unlock the selected locked character using in-game currency. In some embodiments, a character may be unlocked either by use of in-game currency or by game progress in the main game. In some embodiments, a character may only be unlocked by game progress in the main game.

FIG. 3D shows a game play area 430 which shows the user's character 440, the other player's character 442 and their common adversary or foe. By selecting one of the game play icons 406, 408 and 410, the user of the device is able to make a move. By the user selecting a send icon 400, information about the game play made by the user is sent to the other player via the messaging application. In some embodiments, selecting the game area in FIG. 3A will result in the image shown in FIG. 3D being displayed.

Reference is made to FIG. 3E which shows a different example of the lower part of the screen which shows various game play icons 460 and 462. Those game play icons 460 which are selectable by the user and displayed in a visually distinct manner from those game play icons which are not successfully selectable by the user for the current game play. For example, those game play icons which cannot be selected by the user are greyed out. In the example shown in FIG. 3E, a send icon 464 is displayed, but is not selectable until a user has made a game play selection. FIG. 3F illustrates that after the user has made a game play selection, the send icon is displayed in a visually distinct manner and can be selected by the user. The selection of the send icon allows for example the sending of move information to the other player of the game.

Figure 4B:
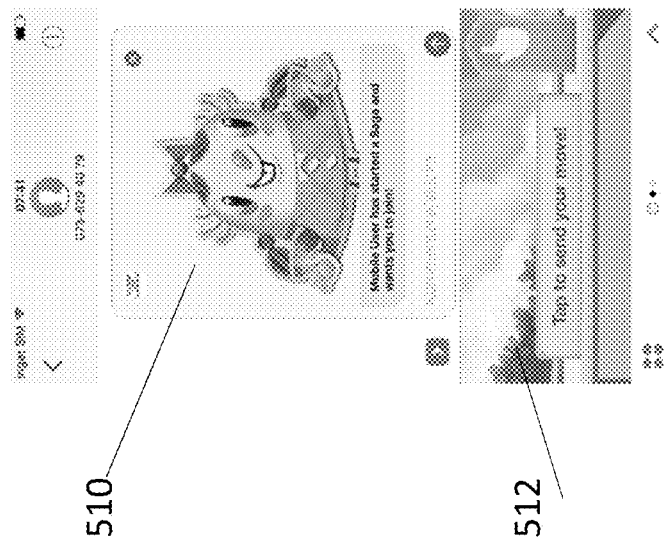
FIGS. 4A and 4B show examples of images displayed on a display, where another user is invited to play a game with a user of the device.
Figure 4A:
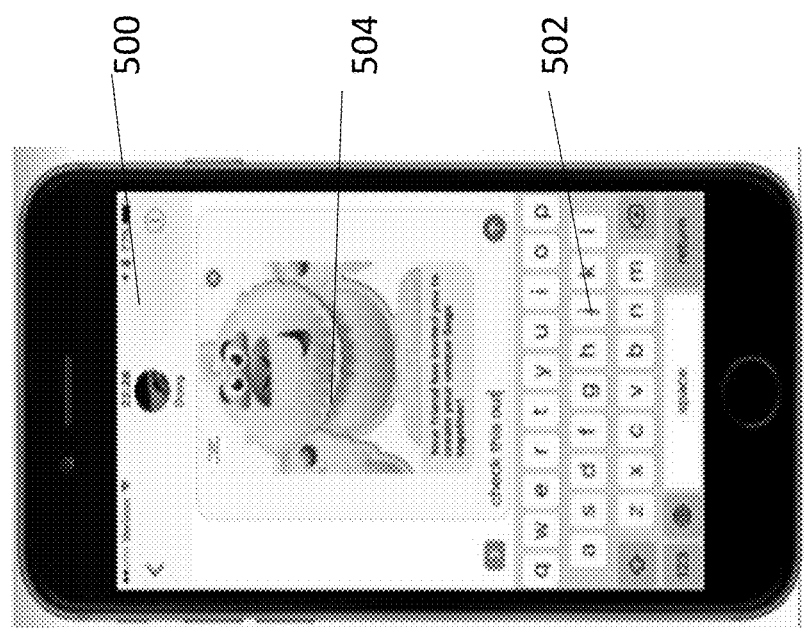

Reference is made to FIG. 4A which shows a display 500 of computer device such as a phone. A user is in a messaging application and composes and sends a message to another user. In this example, the message 504 is an invitation to play a game. When the other user selects the invitation via the user interface, the user may be taken to for example the screen of FIG. 3D.

In the example shown in FIG. 4A, the sender of the message is able to also chat with the other player. The display thus displays a keyboard 502. The user interacts with the keyboard in order to be able to compose the message which is sent to the other player. For example, a message can be sent to the other player with the invitation to play the game.

FIG. 4B shows another example, where a player has received an invitation 510 to play the game from the other player. In this example, the user has made a move in the mini game. There is an area 512 at the bottom of the screen where the player who has received an invitation to play the game is prompted to send information about the move to the other player.

Figure 5:
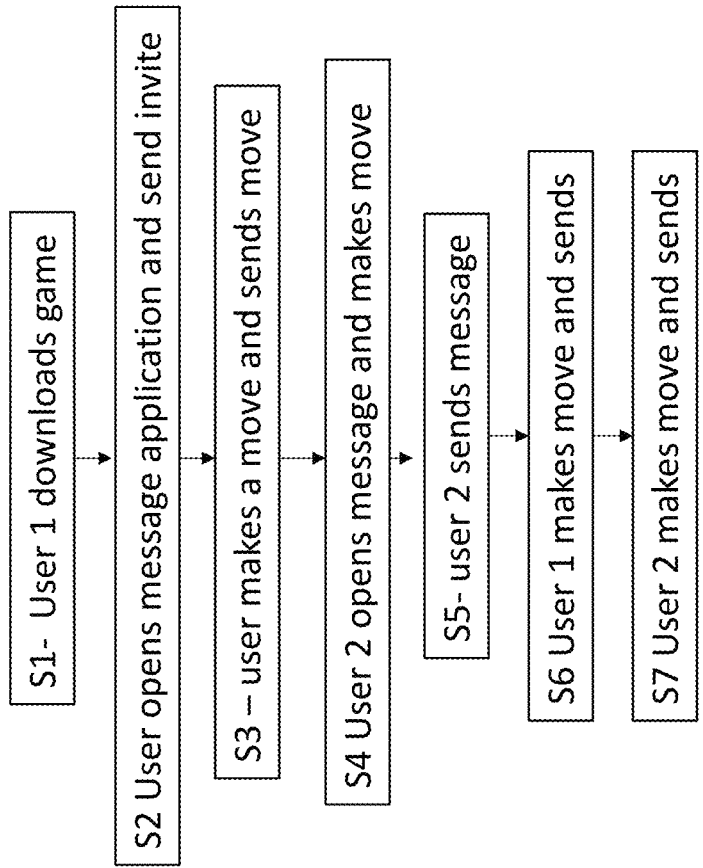
FIG. 5 shows a method of an embodiment.

Reference is now made to FIG. 5 which shows a method of an embodiment.

In step S1, a user downloads a game onto a device. The game may be provided by a game application.

In step S2, the user of the device opens a message application on the device and sends a message to another user of another device. The user also sends an invitation to the another user to play a game in the messaging application. This will be a so-called mini game associated with the regular game.

In step S3, the user of the device may make a move in the mini game. The device will then send information about that move to the another user.

In some embodiments, when a user provides an input to the user interface such that a move is made, this may result in changes in the displayed game. For example the game may have characters and in response to a move the character is animated in a particular way. This may be with one or more objects. The result of the move may be a video clip which is generated by the game code and displayed on the display. It should be appreciated that the content of the video clip will depend on the game being played and the particular move which is made at a particular juncture in the game. This video clip may be automatically generated.

In some embodiments at least part of this video clip is sent to the another user. This may be with other information. In some embodiments, the video clip may be accompanied by game state information.

The video clip may be in any suitable format, for example in the MP4 format.

In some embodiments, the video clip is played automatically. Thus, the display of the message application will show one or more messages. If the message has a video clip, the display is configured to play the video clip within the associated message automatically without requiring a user to select an option which causes the video to be played.

Figure 10:
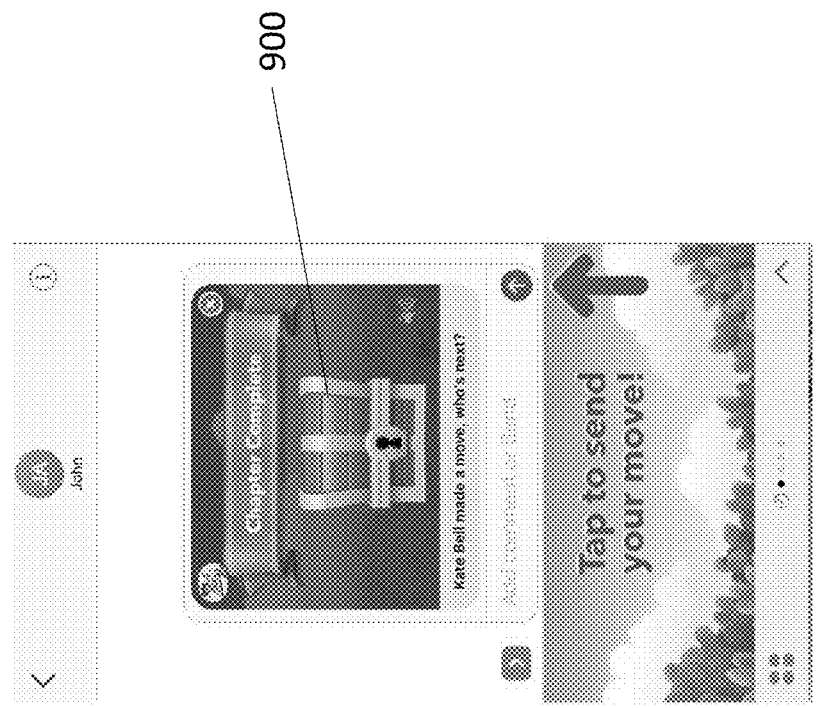
FIG. 10 shows an image of video clip with a reward chest

The video clip may include just move information. In other embodiments, the video clip may be include other information. For example, the video clip may comprise information about the game and/or information about how to play the game, In some embodiments, the video clip which is transmitted and/or received may be shared with others via any suitable social media In some embodiments, the video clip may comprise an image which indicates a new reward or item is available. By way of example, reference is made to FIG. 10 which shows a video clip which has been sent with a closed chest 900 indicating that a reward is awaiting collection. It should be appreciated that the closed chest is only one way of representing a reward or item. This reward or item may be tied to completion of a level in the mini game or the main game.

In some embodiments a message which is sent to the another user may comprise at least part of the video clip and metadata. The meta data may comprise one or more of game data and conversation identity. In some embodiments the meta data may comprise only a conversation identity. In other embodiments, the meta data may comprise the conversation identity and game data. The game data may comprise one or more of game identity, current score, cumulative score, and/or any other suitable game data. The game data may comprise move data defining the move made and/or the outcome of the move.

It should be appreciated that the sending of the video clip may be optional in some embodiments. The above described metadata may be sent without the video clip, in some embodiments. Some embodiments may not have a video clip. In other embodiments, data defining one or more moves may be provided to the receiving device and the receiving device is configured to recreate the video clip using the data defining the one or more moves.

In some embodiments, steps S2 and S3 are combined such the move information is sent at the same time as the invitation to play the game.

In step S4, if the other user has the game, he can open the mini game in the messaging application. When the game is opened the received video clip is played so the other player can see the move made by the first player. In some embodiments, the video clip is played such that it looks similar to game play where the another user has made a move on that device. The other user may be prevented from making a move until the video clip has been played.

The other user may make a move.

It the other user does not have the game application, the other user may be prompted to download the game. This may be achieved by providing a URL or the like for the user to select so the game can be installed. The user will then be able to open the mini game in the messaging application. The mini game instance on each device will have the same identity for the same game. Different instances of the game on a device will have different identities.

In step S5, the device of the other user will send the move to the first user. The other user may also send a message. It should be appreciated that a video clip of the move made by the other user may be sent to the first user.

In steps S6 and S7, the exchange of moves will continue. It should be appreciated that in some embodiments, steps S6 and S7 may be omitted.

It should be appreciated that the game can continue as long as the two users remain in a conversation.

A move can be with respect to single target or all of the opponents.

After each chapter or level of the mini game and/or main game, a player may be provided with a reward. For example this may be an upgraded or item which can be utilised in a different game.

In some embodiments, where a user is playing a mini game and makes a move, the user is able to select via the user interface a send option. This may directly cause the message to be sent in some embodiments. In other embodiments, this will cause the display to show the message application where a draft message with information about the game is shown. If the user selects the message application send option, then the message with the game information will be sent.

In some embodiments a user can play with different users in different conversations. There will be a different game in each conversation.

In some embodiments, the game server can be used to store the game progress. Information about game play from each device will be provided to the game server and used to synchronise the game play across the two or more devices. In some embodiments, some or all game play may be synchronised by means of the messages exchanges.

In some embodiments, the moves which are made by the computer opponent, may be generated by the game server and/or by the game on the user device.

In some embodiments, each conversation may be associated with a session identifier or the like which allows the server to use this identity to obtain the relevant game data. Any new data is stored in association with this identifier.

The game servers and/or client on the user device may be utilised to handle the upgrade of characters or items or the like in the game.

Some messaging applications, for example provide images which can be used within conversations. These images are sometimes referred to as stickers. The image can be still images or animated images. A user is able to select an image to be sent in a thread of a conversation, place them over conversation areas or over other images. These images are available to the user without requiring the user to leave the messaging application. The images are thus available to a user within the messaging application.

In some embodiments, when a user is playing a game within the context of the message application a set of stickers or images is available. The stickers or images may be associated the game. In some embodiments, the stickers or images which are provided may be dependent on progress made by the user in one or other or both of the main game and the mini game.

In some embodiments the images which are available may be depend on the current level or game and/or location of at least one of the user devices being used to play the game and/or time information.

In some embodiments, video of the gameplay is captured and recorded. A sticker may be created and transmitted as part of the gameplay. This sticker may thus be transmitted to the other players via the messaging application. In some embodiments, the sticker may indicate that a move has been made. In some embodiments, the sticker may comprise an animation comprising part of the game play, the part of the move, a character involved in the game play or any suitable image. For example the move made is seen in the sticker, and/or a reaction of an opponent to the move (for example an opponent may be shown as being hit), or the player's selected character is shown executing its move. Thus in some embodiments video of the gameplay in the mini game is captured and shown in the conversation.

In some embodiments, data may be associated with the sticker such that interaction with the sticker may trigger the mini game to open so that the recipient is able to make their move.

This has been described in the context of stickers. However, it should be appreciated that other embodiments may be used with other types of image, still or moving.

The at least one processor may be configured to capture one or more of a still image and a moving image during game play of the first computer implemented game and cause the captured one or more of the still image and moving image to be transmitted in the conversation.

The receipt of the one or more of the still image and moving image may facilitate the making of for example a move at the device. The one or more of the still image and moving image may be such that interaction therewith via the user interface may cause a game area to be displayed at the second device.

By way of example only, FIG. 7A shows one possible set of initial mini game information in an associated data structure.

Player identity information is provided in a first field 600. Game identity information is provided in a second field 602. Device identity information may be provided in a third field 604. Game level information may be provided in a fourth field. The fifth field may comprise information associated with the identity of the second player 612. The sixth field may comprise message information which is to be provided to the other player. This will define a message to be displayed and may be text and/or one or more of a predefined message option.

It should be appreciated that the order of the fields is by way of example only and in other embodiments, the fields may be provided in any other suitable order. It should be appreciated that in some embodiments, one or more of the fields shown may be omitted. Alternatively or additionally, one or more other suitable fields may be provided.

By way of example, reference is made to FIG. 7B which shows one example of the data structure which may be used during a mini game. This game data structure may comprise a first field 600 comprising the player identity information.

A second field 602 may provide game identity information. This may define the instance of the game and so identify in the context of which conversation the game is being played. In some embodiments, a plurality of fields may be provided to provide the game identity information. For example one field may provide the game name and another field may define a particular instance of the game In a third field 612, a game event is provided. That game event may provide move information or any other suitable game event information. It should be appreciated that in some embodiments one or more additional fields may be provided. In some embodiments, alternatively or additionally, one or more of the field shown may be omitted.

The data structure may be sent in the message data of the messaging application. Alternatively or additionally the data may be sent to the computer game infrastructure.

Figure 8A:
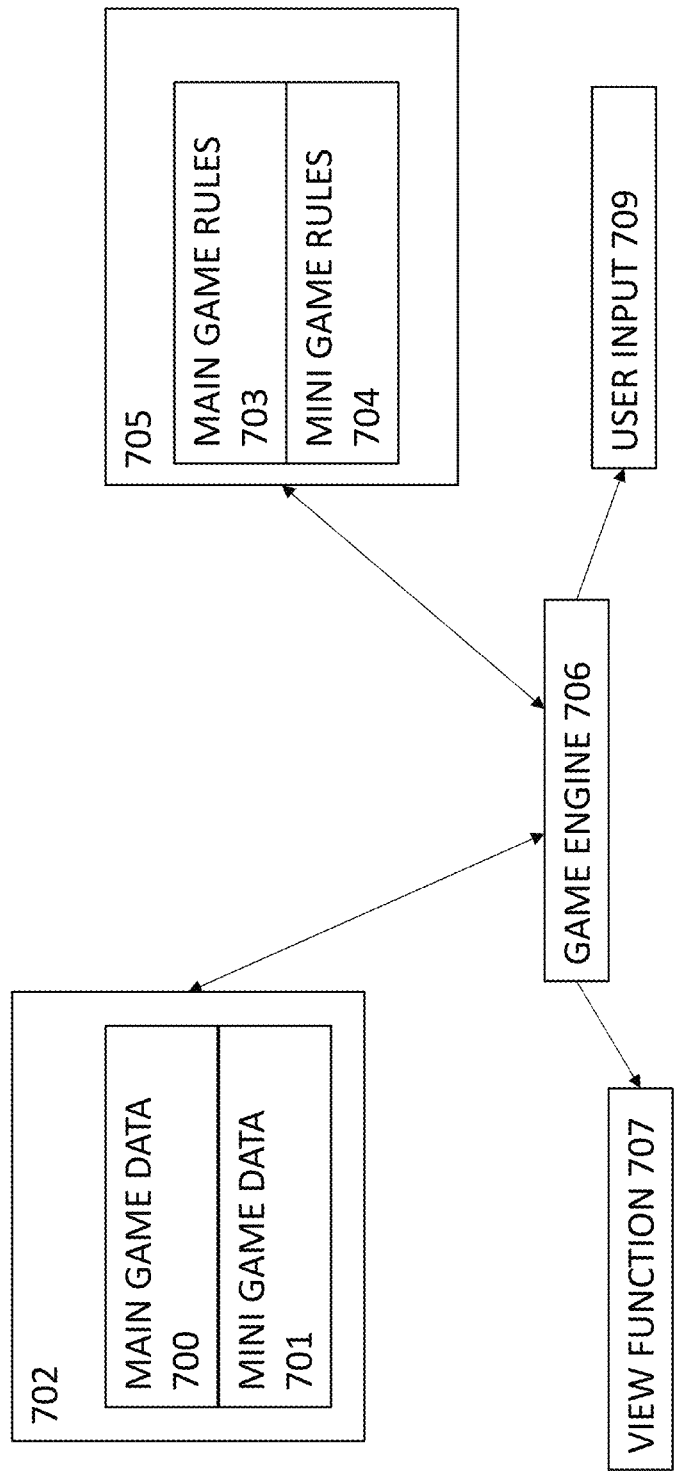
FIG. 8A shows schematically the functions of the user device supporting respective functions of the computer implemented games.

Reference is made to FIG. 8A which schematically shows an embodiment. In a user device there is a game data store 702 which has a part 700 for the main game data and a part 701 for the mini game data. In this example the mini game and the main game are provided by the same game application. The game data is schematically shown as separate data however, in some embodiments the data for the main game and the mini game may be together. The game data may comprise any suitable data.

For example, the game data may comprise progress data. For example, this may comprise data such as level reached, available characters, score information and the like. If a game or round has not been completed, game data may be stored which allows the player to continue from the last reached point.

In some embodiments, the progress of the other player in the mini game may be stored.

The game data may comprise information indicating whose turn it is to play the game, in the case of the mini game.

A game rule function 705 may be provided. The game rule function may comprise a main game rule part 703 and a mini game rule part 704. In other embodiments there may be no separation between the main game rule part and the mini game rule part. The game function may comprise a rule storage part and a rule applying part. The rules control the game play functions. For example the games rule function may define what moves are permitted by a user and the response to the moves made. The rules may define which characters are available for game play in either or both of the main and mini games. The rules may also define the progress which a user may make through the main game and the mini game.

A game engine function 706 is provided. The game engine function is configured to receive user input 709 via a user interface. The game engine function is configured to communicate with the game data store 702 and the game rule function 705.

The mini game data may include data identifying different instances of the game. For each instance of the game, information about the participants in the game as well as game progress information may be stored.

A view function 807 is controlled by the game engine to cause the respective games to be displayed on the display of the device.

Figure 8B:
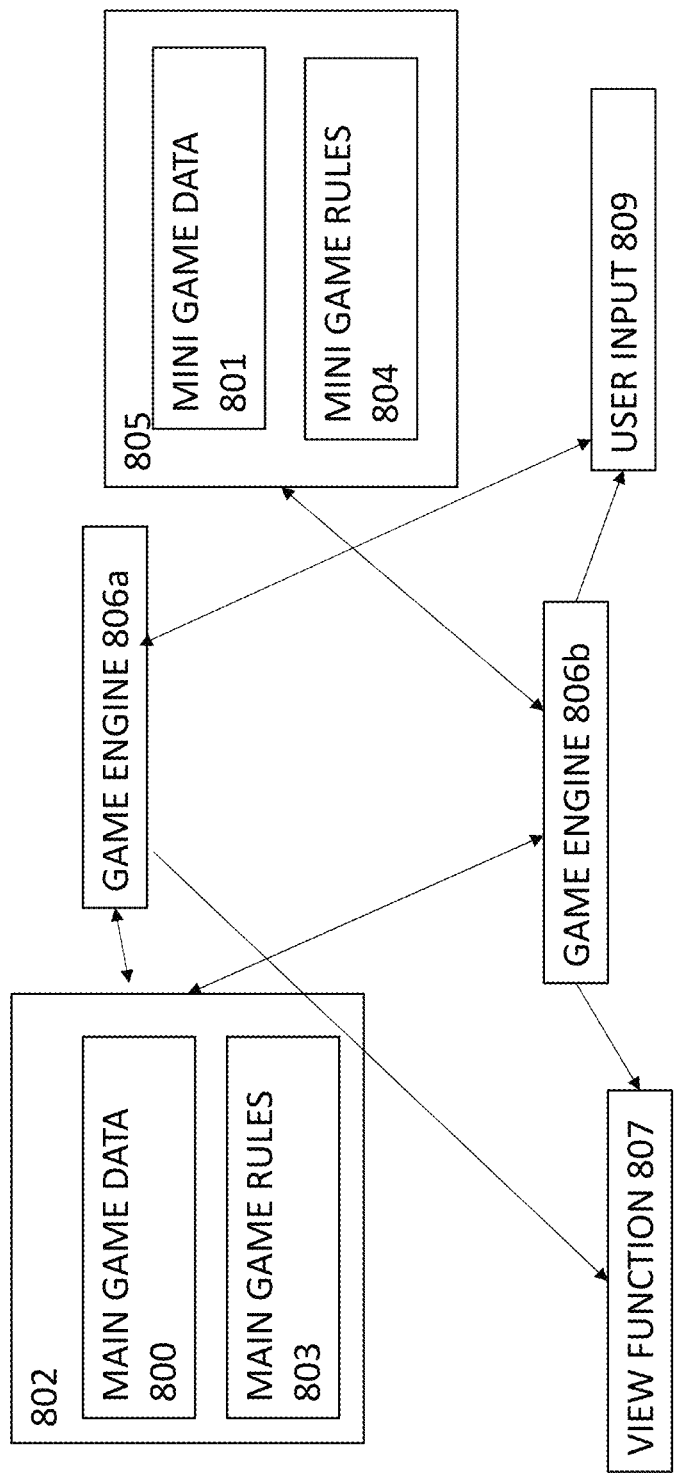
FIG. 8B shows schematically shows an alternative arrangement of functions of the user device supporting the respective functions of the computer implemented games.

Reference is made to FIG. 8B which schematically shows an embodiment. In this embodiment, the mini game and the main game are provided by separate game applications.

In a user device there is a part 802 for the main game. This part 802 comprises a main game data store 800 which stores the main game data. This game data may be as previously described. This part 802 also comprise a main game rule part 803.

The main game rule part game function may comprise a rule storage part and a rule applying part.

In the user device there is a part 805 for the mini game. This part 805 comprises a mini game data store 801 which stores the mini game data. This mini game data may be as previously described. This part 802 also comprise a mini game rule part 804. The mini game rule part game function may comprise a rule storage part and a rule applying part.

A first game engine function 806a is provided for the main game. The game engine function is configured to receive user input 809 via a user interface. The game engine function is configured to communicate with the main game part 802 and to control game play of the main game. The first game engine function 806a is arranged to provide an output to the view function to provide the image of the game.

A second game engine function 806b is provided for the mini game. The second game engine function 806b is configured to receive user input 809 via a user interface. The second game engine function is configured to communicate with the main game part 802 to get game play information from the main game and the mini game part 805 to thereby control game play of the mini game. The second game engine function 806b is arranged to provide an output to the view function to provide the image of the game.

In some embodiments, a single game engine function may control both games.

In some embodiments, each game may have its own view function.

A game challenge may be a level of a game. In other embodiments, a game challenge may be a variation of a game. For example, the variation may comprise one or more of game goals, properties of one or more game objects, rules of game or the like.

In some embodiments, a new game challenge may be available after a fixed period of time or at predefined times. However, the new game challenge may only be available after this fixed period of time or predefined time if a previous game challenge has been completed. In some embodiments, once a challenge is completed, the players may be forced to wait a period of time for the next challenge. For example, if a new challenge is available every day, the players may be forced to wait until the next day before a new challenge is available if they have yet to complete their current challenge. In some embodiments, the new challenge which is made available may be solely dependent on the game play in the particular game. In other embodiments, for players who complete a challenge within given time, a new set of one or more challenges is provided in each time period. One of the set of challenges will be provided.

In some embodiments, the location of one or both of the players is determined. The information about the location of one or more players is used to determine which one or more challenges of the set of are available to a player. In some embodiments, one or more challenges may be dependent on location.

Figure 9:
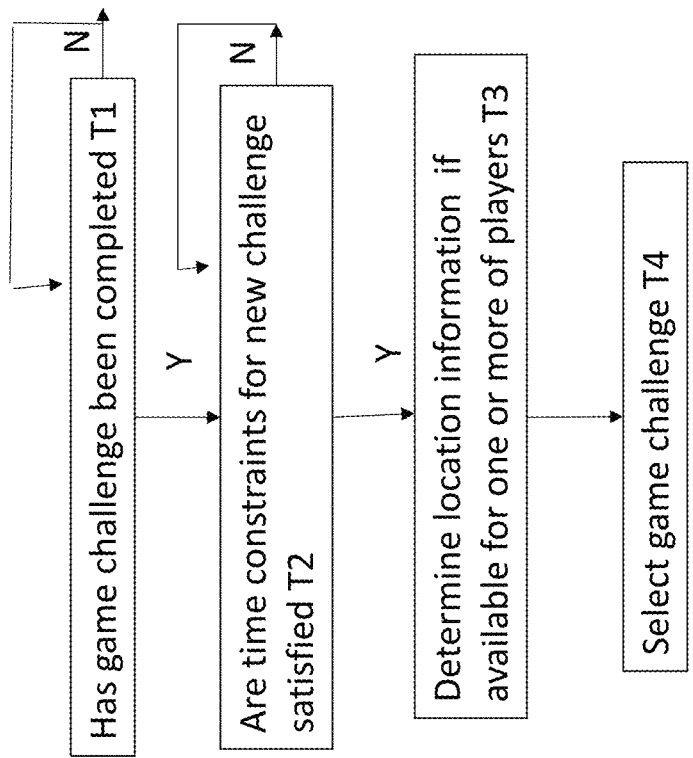
FIG. 9 shows a method of an embodiment for determining game challenges.

Reference is made by way of example to FIG. 9 which shows a method of some embodiments.

In step T1, it is determined if a current game challenge which is being played within a conversation has been completed. This determination may be carried out in the game device and/or in the game server. This may be carried out in response to receiving game data from one or more of the user devices associated with the respective game. The game data may be an indication that a challenge has been completed and/or a request for a new challenge.

In one embodiment, a determination is made at the game server each time data is received from the players as to whether a game challenge is completed.

When it is determined at the game server that the game data which has been received that a game challenge is completed, it is determined if the time constraints for a new challenge are satisfied. The time constraints may be any suitable constraints. For example, some challenges may only be available from a particular time or date. In some embodiments, alternatively or additionally there may be a predefined time between the completion of one game challenge and the availability of the next challenge.

In some embodiments, the time constraints are defined by real world time whilst in other embodiments the time constraints may be defined by a timer or counter which is provided in the main game.

If it is determined that the time constraints are satisfied, the game server is configured to check if location information for one or more of the players is available in step T3. This may be optional. The game server may request the information from the respective user devices or be provided the respective location data from the respective user devices.

Steps T2 and T3 can take place in any order or at the same time.

Step T3 may in some embodiments take place at the same time as step T1 or before step T1.

In step T4, a new challenge is selected. This may be based on the location information. For example some challenges may only be available when one or more players are in a particular location. In some embodiments, a plurality of location criteria may need to be satisfied in order for a particular game challenge to be available. For example the players' devices may be required to be in New York and Paris in order to get a particular challenge.

In some embodiments, one or more challenges may only be available at particular times. For example a challenge may have a Christmas theme and is only available at Christmas time. The form of the challenge may be dependent on the location of one or more of the players.

In some embodiments, one or more in game characters and/or objects and/or game graphics may be dependent on the location of one or other or both of the devices used to play the game.

In some embodiments, there may be a set of potential game challenges and one of the set is selected.

In some embodiments, a great variation in game play can be achieved for different games, in a resource efficient manner.

In some embodiments, if a challenge is not completed within a given time, the game may progress in a backwards direction and the game reverts to a challenge previous to a current game challenge.

In some embodiments, the selection step may take into account progress by one or more of the players in the main game when determining which challenge to provide in the mini game.

It should be appreciated that the casual game used in some embodiments can be any other suitable game. For example, the game may be so called 'clicker' game where the player can click on a group of adjacent game elements of a certain type and those will then be removed. Some clicker games only require two adjacent objects to remove those elements if clicked by the user. Others may require more than two.

Another type of match games are the so called 'switcher' games where the player switches the place of two adjacent game elements on the game board so that one or both of them create a chain of at least three adjacent game elements of the same type. Those matched game elements will then disappear. In a typical switcher game the game board will be repopulated with game objects.

Another type of match game are the so called 'shooter' games where the player launches for example a ball or bubble on to the game board trying to aim at groups of similar game elements already on the game board. If the launched ball hits or forms a group of more than 3 similar game elements then that group of game elements are removed from the game board.

Some embodiments have been described in the context of specific types of product/software. It should be appreciated that this is by way of example only and other embodiments may be implemented using any other product/software.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

An appropriately adapted computer program code product or products may be used for implementing the embodiments, when loaded on an appropriate data processing apparatus, and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof.

Some embodiments may be provided as a computer program product, included on a computer or machine-readable medium having stored thereon the executable instructions of a computer-readable program that when executed on at least one processor cause a method according to some embodiments to be carried. The terms "computer-readable medium" or "machine-readable medium" as used herein includes any medium that participates in providing instructions to a processor or other components of computer system for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium. Some embodiments may be downloaded or distributed as a computer program product, wherein the computer-readable program instructions may be transmitted from a remote computer such as a server to a user device by way of data signals embodied in a carrier wave or other propagation medium via a network.

The person skilled in the art will realise that the different approaches to implementing the methods and control module are not exhaustive, and what is described herein are certain embodiments. It is possible to implement the above in a number of variations without departing from the spirit or scope of the invention.

The invention claimed is:

1. A first computer device, the first computer device having at least one processor, at least one memory, a display, and a user interface, the at least one processor configured to:
   cause the display to display images associated with a messaging application, said messaging application supporting messaging between the first computer device associated with a first user and a second computer device associated with a second user;

receive first user input information from the user interface to select a first computer implemented game to play within the messaging application, the first computer implemented game being related to a second computer implemented game, the first computer implemented game being different to the second computer implemented game, whereby game play in one of the first and second computer implemented games is dependent on game play in the other of the first and second computer implemented games;

cause the display to display game information for the first computer implemented game within the messaging application;

receive second user input information from the user interface defining one or more game moves with respect to the first computer implemented game within the messaging application; and cause a first message to be sent via the messaging application to the second computer device associated with the second user responsive to the received second user input information, the first message comprising information relating to the one or more moves.

2. The first computer device as claimed in claim 1, wherein the game information comprises one or more of: a game board for the first computer implemented game; selectable game options for the first computer game; and one or more game launch options for the first computer implemented game.

3. The first computer device as claimed in claim 1, wherein the at least one processor is configured to receive third user input information from the user interface and in response thereto to cause a launch of the messaging application and the display of the images associated with the messaging application.

4. The first computer device as claimed in claim 1, wherein the at least one processor is configured to receive a second message comprising information relating to at least one move made at the second computer device and in response to said the second message displaying on the display updated game information.

5. The first computer device as claimed in claim 1, wherein the first computer implemented game comprises a game for two or more players and the second computer implemented game comprises a game for a single player.

6. The first computer device as claimed in claim 1, wherein the first computer implemented game is a collaborative game.

7. The first computer device as claimed in claim 1, wherein at least one game play option for the first computer implemented game is dependent on information associated with the second computer implemented game.

8. The first computer device as claimed in claim 7, wherein the at least one game play option for the first computer implemented game comprises one or more of: game character; in-game assistance; game rules; and game graphics.

9. The first computer device as claimed in claim 1, wherein the at least one processor is configured to the cause sending of a third message to a third computer device associated with a third user whilst in a conversation of the messaging application, the third message to the third computer device comprising game information related to the first computer implemented game, and to receive a fourth message comprising information relating to interaction, by the third user at the third computer device, with the first computer implemented game, whereby the first user, the second user and the third user play the same instance of the first computer implemented game.

10. The first computer device as claimed claim 1, wherein the at least one processor is configured to receive fourth user input via the user interface to select the first computer implemented game within the messaging application in a second conversation, the second conversation being a different conversation to a first conversation between the first and second users, the second conversation being between the first user and at least one other user, there being different instances of the first computer implemented game in the first and second conversations.

11. The first computer device as claimed in claim 1, wherein the at least one processor is configured to be responsive to receiving the second user input from the user interface to cause display on the display of a video image associated with second user input, the first message comprising a video clip of the video image.

12. The first computer device as claimed in claim 1, wherein the first and second computer games are provided by a same application.

13. The first computer device as claimed in claim 1, wherein the first and second computer games are provided by respective applications.

14. The first computer device as claimed in claim 1, wherein the at least one processor is configured to receive a fifth user input from the user interface to select a message send option, and in response to provide a draft of the first message in the message application and in response to a sixth input selecting a send option, causing the first message to be sent.

15. The first computer device as claimed in claim 1, wherein the first implemented game comprises a plurality of different game challenges, the at least one processor configured to determine if a current game challenge has been completed and if so, provide a next game challenge.

16. The first computer device as claimed 15, wherein the next game challenge is dependent on a location of one or more of the first and second computer devices.

17. The first computer device as claimed in claim 15, wherein the at least one processor is configured to determine if a time criteria has been satisfied and the game challenge has been completed, and when both the time criteria has been satisfied and the game challenge has been completed, providing a next game challenge.

18. The first computer device as claimed in claim 1, wherein a set of images is provided within the messaging application, one or more images in the set of images being dependent on game play in at least one of one of the first and second computer implemented games.

19. The first computer device as claimed in claim 1, wherein the at least one processor is configured to capture one or more of a still image and a moving image during game play of the first computer implemented game and cause the captured one or more of the still image and moving image be transmitted in the conversation.

20. A non-transitory computer readable storage device storing instructions that, when executed by at least one processor of a first computer device causes the at least one processor to perform the following steps:

cause a display to display images associated with a messaging application, said messaging application supporting messaging between the first computer device associated with a first user and a second computer device associated with a second user;

receive first user input information from the user interface to select a first computer implemented game to play within the messaging application, the first computer implemented game being related to a second computer implemented game, the first computer implemented game being different to the second computer implemented game, whereby game play in one of the first and second computer implemented games is dependent on game play in the other of the first and second computer implemented games;

cause the display to display game information for the first computer implemented game within the messaging application;

receive second user input information from the user interface defining one or more game moves with respect to the first computer implemented game within the messaging application; and cause a first message to be sent via the messaging application to the second computer device associated with the second user responsive to the received second user input information, the first message comprising information relating to the one or more moves.

21. A computer implemented method performed by a first computer device, the first computer device having at least one processor, at least one memory, a display, and a user interface, the method comprising:

causing the display to display images associated with a messaging application, said messaging application supporting messaging between the first computer device associated with a first user and a second computer device associated with a second user;

receiving first user input information from the user interface to select a first computer implemented game to play within the messaging application, the first computer implemented game being related to a second computer implemented game, the first computer implemented game being different to the second computer implemented game, whereby game play in one of the first and second computer implemented games is dependent on game play in the other of the first and second computer implemented games;

causing the display to display game information for the first computer implemented game within the messaging application;

receiving second user input information from the user interface defining one or more game moves with respect to the first computer implemented game within the messaging application; and causing a first message to be sent via the messaging application to the second computer device associated with the second user responsive to the received second user input information, the first message comprising information relating to the one or more moves.

* * * * *